United States Patent [19]

Todoh

[11] Patent Number: 4,516,135
[45] Date of Patent: May 7, 1985

[54] THERMAL PRINTER CAPABLE OF REPRODUCING HALFTONE IMAGE

[75] Inventor: Hidemasa Todoh, Hongo Ebina, Japan

[73] Assignee: Fuji Xerox Co., Ltd., Tokyo, Japan

[21] Appl. No.: 476,627

[22] Filed: Mar. 18, 1983

[30] Foreign Application Priority Data

Mar. 19, 1982 [JP] Japan .................................. 57-44206

[51] Int. Cl.³ ............................................. B41S 3/02
[52] U.S. Cl. .................................. 346/76 PH; 358/298
[58] Field of Search ..................... 346/76 PH, 76 R; 400/120; 219/216 PH; 358/78, 280, 283, 296, 298

[56] References Cited

U.S. PATENT DOCUMENTS 4,335,968  6/1982  Regnault ...................... 346/76 PH
4,376,942  3/1983  Toth et al. ..................... 346/76 PH
4,377,972  3/1983  O'Neil ............................ 346/76 PH Primary Examiner—E. A. Goldberg
Assistant Examiner—A. Evans
Attorney, Agent, or Firm—Spensley Horn Jubas & Lubitz

[57] ABSTRACT

A thermal printer performs halftone reproduction of image by applying energy of an electrical signal which varies in response to the data representing tone graduation grade of the image into resistor heating element of the printer. The electrical signal to be applied to the heating element is not directly obtained from the above data but it is formed based on the conversion data stored in advance in a memory in which the characteristics of image receiving paper or inking material is taken into consideration.

6 Claims, 6 Drawing Figures

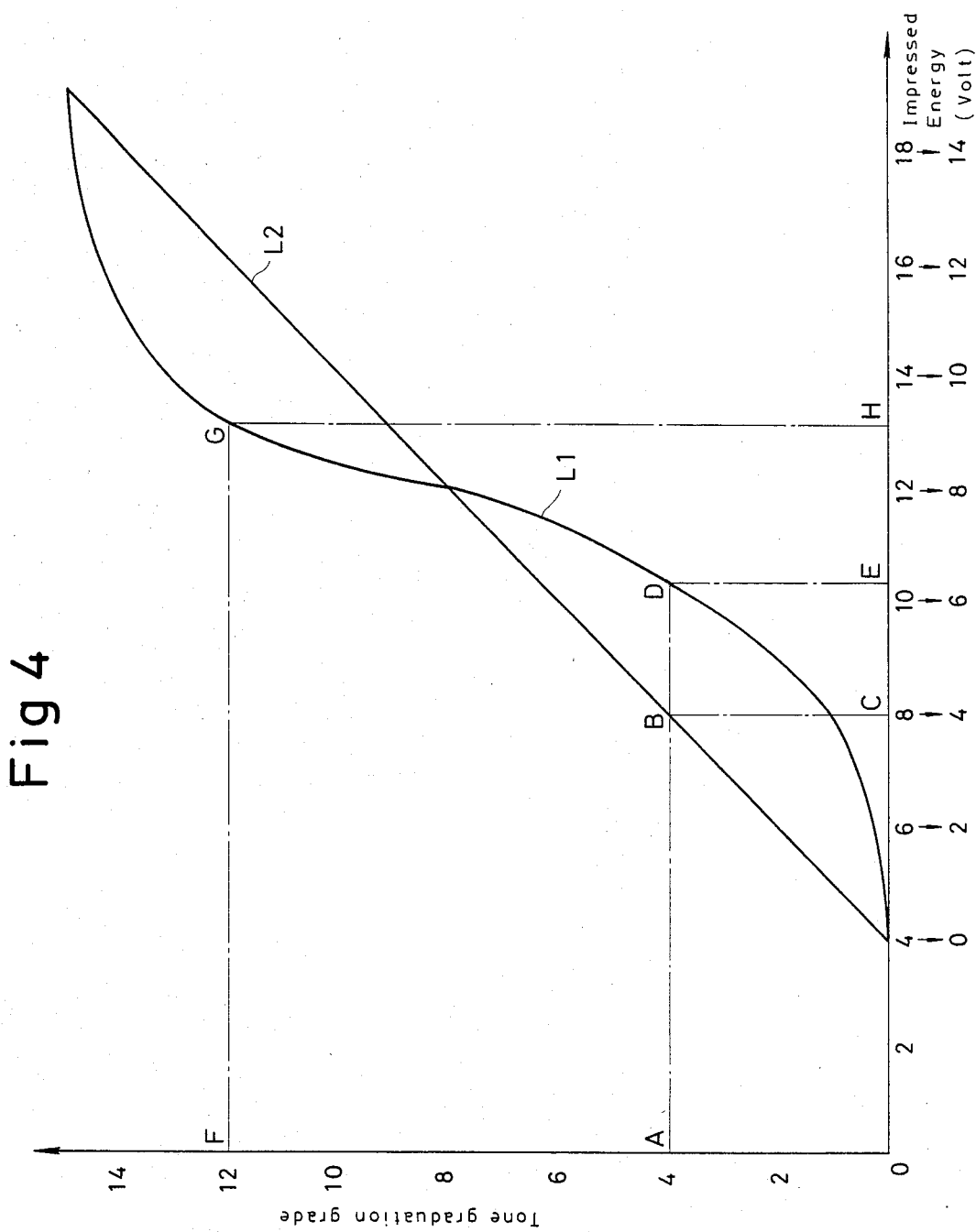

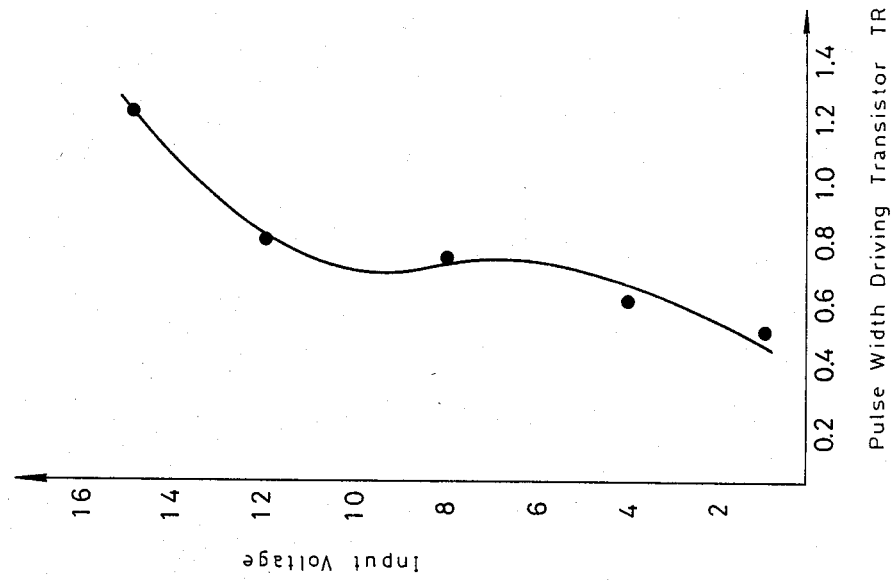
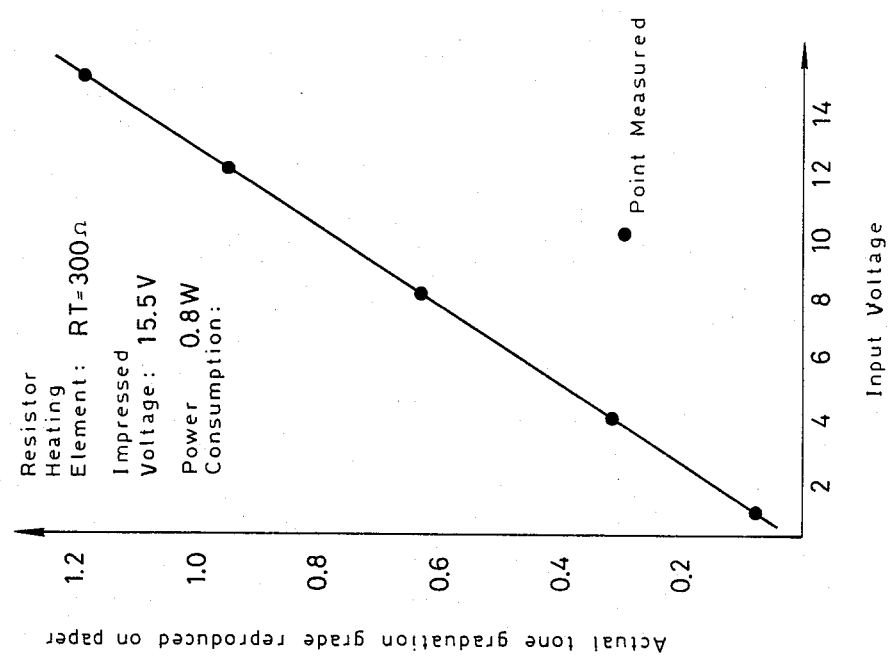

THERMAL PRINTER CAPABLE OF REPRODUCING HALFTONE IMAGE

BACKGROUND OF THE INVENTION

1. Field of the Invention

The present invention relates to a thermal printer utilized in printers, facsimile equipments or the like, and particularly to a thermal printer capable of reproducing halftone image on image receiving paper.

2. Description of the Prior Art

In a conventional thermal printer capable of reproducing halftone image such method has been adopted which comprises steps of dividing each element unit of image to be reproduced into a plurality of dots, and suitably selecting ratio of black dots and white dots in this element unit, whereby tone graduation, i.e., light and shade, of the image is simulatively reproduced.

In such prior art, however, it is required that one element unit of the image is composed of a large number of dots in order to express various grade of tone graduation, and further it is necessary for providing a plurality of thermal heads corresponding to each one element unit of image, and yet there is such a disadvantage that resolution is not very high.

In another conventional thermal printer for effecting the halftone reproduction in image, attention is paid to characteristics of image receiving paper on which image is reproduced. FIG. 1 shows a relationship between energy to be impressed to a thermal head and density of dots on the image receiving paper wherein a range indicated by ΔE has favorable linearity. Attention is paid to such range, and the energy to be impressed to the thermal head is controlled within the aforesaid range, thus tring to achieve halftone image reproduction.

In this method, however, the range which can be utilized is limited, and even in such range linearity is not completely insured. Thus, such thermal printer has a disadvantage in that errors take place in the halftone reproduction so that favorable image reproduction onto receiving paper cannot be obtained, besides contrast in the reproduced image is insufficient.

SUMMARY OF THE INVENTION

Accordingly, the present invention has been made in view of the unfavorable situation as mentioned above, and therefore, it is an object of the invention to provide a thermal printer capable of reproducting tone graduation of image on image receiving paper with high resolution and good reproductivity.

Namely, according to one aspect of the present invention, there is proposed a thermal printer in which tone graduation data is not directly converted into energy to be impressed to the thermal head, but the data is converted into a value based on the relationship between image graduation grade and energy to be impressed to the thermal head by utilizing a memory means in which data representing the aforesaid characteristics are stored, whereby a linearity between the tone graduation data and actual tone graduation reproduced is elevated whereby halftone is reproduced with high resolution and good reproductivity.

This and other objects of the present invention will become apparent in view of the following detailed description and the accompanying drawings.

BRIEF DESCRIPTION OF THE DRAWINGS

In the drawings:

FIG. 4 is a graphical representation indicating a relationship between tone graduation grade of image and energy to be impressed to the thermal head in the thermal, printer shown in FIG. 3;

FIG. 5 is a graphical representation showing a relationship between input voltage to the thermal printer and dot density on receiving paper of an embodiment; and FIG. 6 is a graphical representation showing a relationship between input voltage and pulse width for driving transistors of the embodiment in FIG. 5.

PREFERRED EMBODIMENT OF THIS INVENTION

A thermal printer according to the present invention will be described in detail hereinbelow by referring to the accompanying drawings illustrating a preferred embodiment of the invention.

Figure 1:
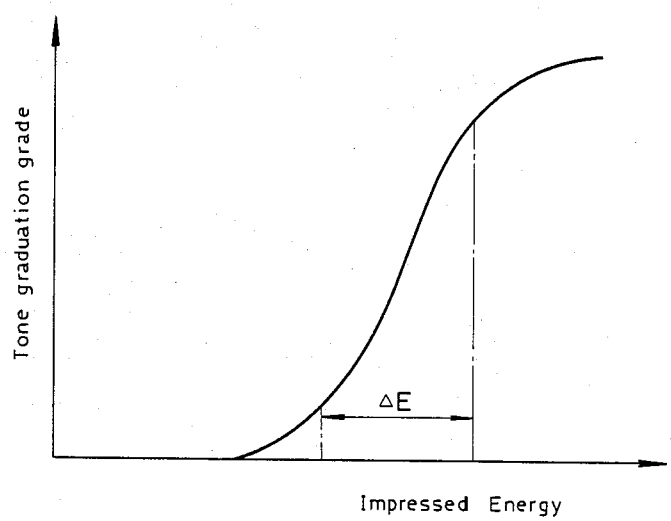
FIG. 1 is a graphical representation showing a relationship between tone graduation grade of image and dot density of receiving paper in a conventional thermal printer.
Figure 2:
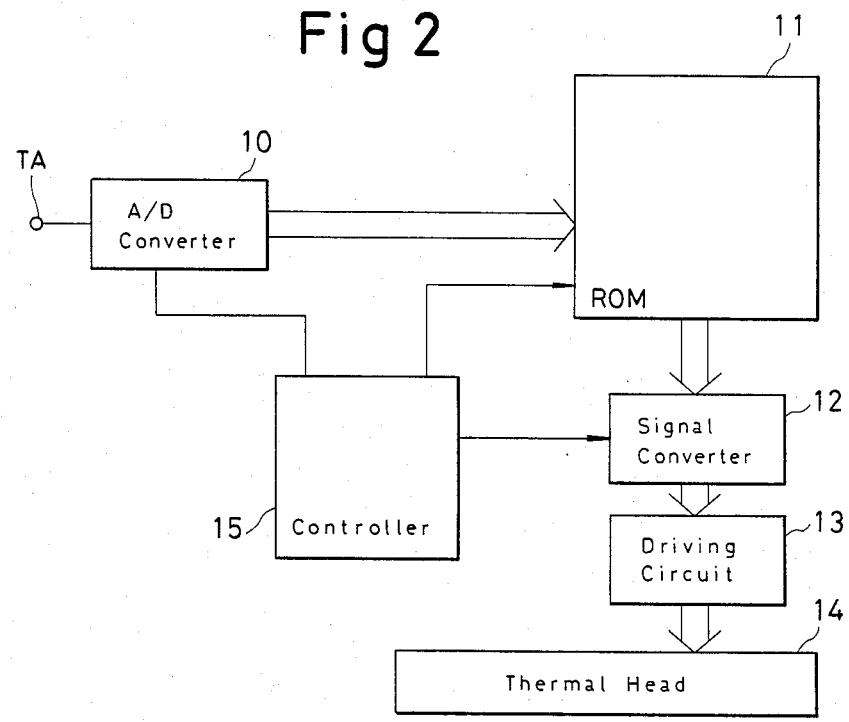
FIG. 2 is a block diagram illustrating a constructional example of a thermal printer according to the present invention.

FIG. 2 is a block diagram showing an outline of one constructional example of the thermal printer according to the present invention in which a signal representing pictorial pattern(image) is inputted from a terminal TA to an A/D converter 10 in which the signal is converted into digital signal. Output signal from the A/D converter 10 is supplied to a ROM 11 through address terminal thereof. In the ROM 11, conversion data in which non-linearity in the curve in FIG. 1 is taken into consideration are stored.

Output data from the ROM 11 is then inputted to a signal converter 12, in which data is adjusted and converted into a signal suitable for driving a thermal head 14. This signal converter 12 is connected to a driving circuit 13, whereby the thermal head 14 is driven.

Furthermore, control signals are supplied from a controller 15 to the A/D converter 10, ROM 11 and signal converter 12, respectively, so that timing of the whole operation is controlled.

In this connection, an outline of the operation of the thermal printer according to the present invention will be described herein.

The conversion data in which non-linearity of the curve of FIG. 1 is taken into consideration have been stored in advance in the ROM 11 at the addresses which are designated on the basis of the data supplied from the A/D converter. More particularly, the ordinate in FIG. 1 corresponds to the address of the ROM 11, whilst the abscissa in FIG. 1 corresponds to output of the ROM 11 and a suitable value is stored in each address of the ROM 11 so that data conversion is effected in accordance with the curve represented in FIG. 1. Thus, when a certain address is designated, that is, when a degree of tone graduation is designated by the output signal of the A/D convertor 10, a value corresponding to energy to be applied to the thermal head 14 for reproducing the tone graduation of image is outputted from the ROM 11. When the thermal head 14 is adapted to be driven on the basis of such arrangement as mentioned above, it becomes possible to make halftone reproduction having high resolution and exellent reproductivity.

Figure 3:
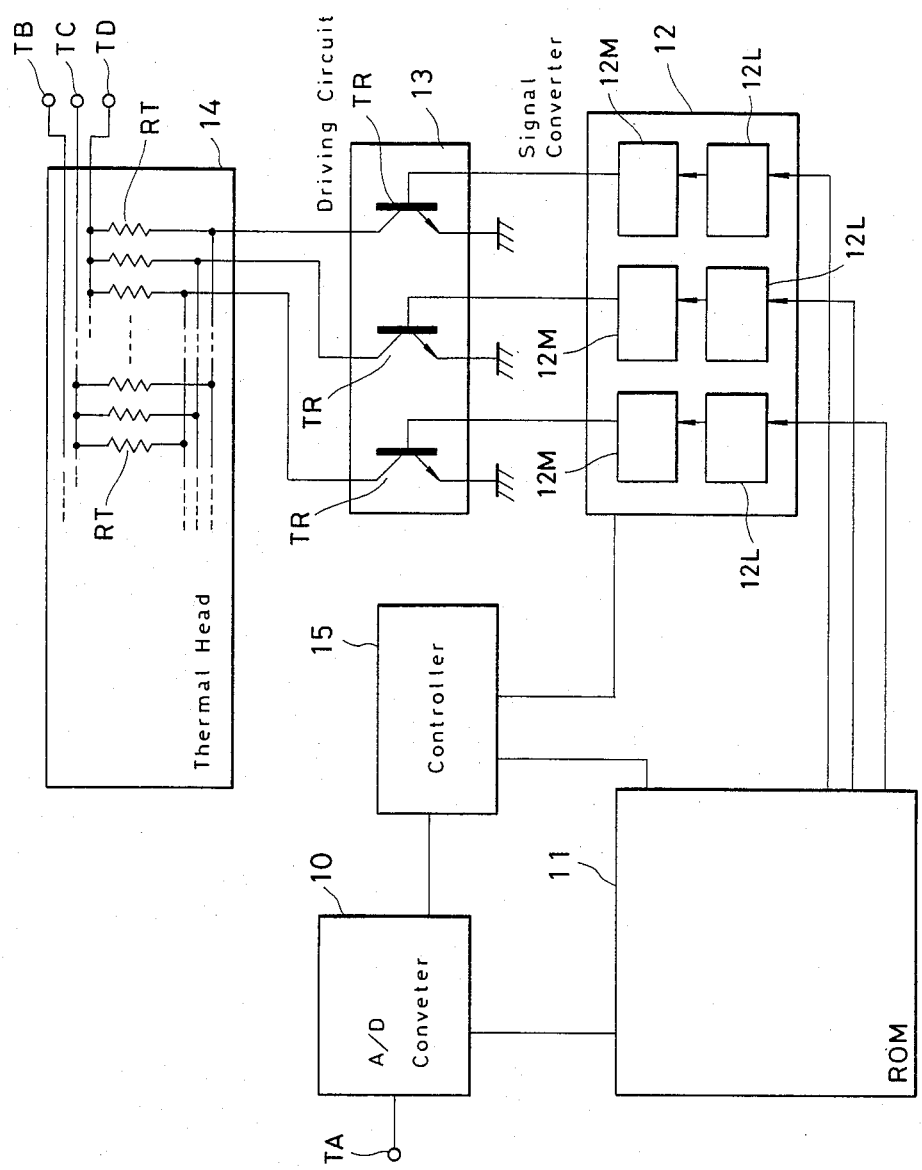
FIG. 3 is a block diagram showing the construction of FIG. 2 in more detail.

FIG. 3 is a block diagram illustrating the construction shown in FIG. 2 in more detail wherein the thermal head 14 is composed of a suitable number of resistor heating elements RT, each one end of which is connected to any one of terminal TB, TC and TD to which proper bias voltage is applied, and the other terminal of each resistor heating element RT is connected to any one of transistors TR which construct the driving circuit 13 to be described in detail below. The manner of the above connection becomes different in accordance with methods for driving resistor heating elements RT such as a method for concurrently driving the resistor heating elements, a method for driving in time-sharing manner, and a method in which the resistor heating elements are connected in a matrix form and are driven sequentially. The order of data entry to the terminal TA is determined in accordance with the driving methods of the resistor heating elements. In the embodiment as illustrated in FIG. 3, the resistor heating elements RT are arranged in matrix form, and the driving circuit 13 is composed of three transistors TR. In each transistor TR, collector is suitably connected to each of the resistor heating elements RT, emitter is grounded, and base is connected to the signal converter 12. The signal converter 12 is provided with three sets of serially connected circuits each consisting of a latch circuit 12L and a pulse width modulator 12M. Each latch circuit 12L is arranged in such a manner that output data of the ROM 11 are inputted thereto, while each pulse width modulator 12M is connected to each transistor TR in the driving circuit 13. The latch circuit 12L tempararily holds the output data of the ROM 11, whilst the pulse width modulator 12M outputs a pulse whose width is in response to the data held in the latch circuit 12L at a constant timing by means of the pulse supplied from the controller 15.

Next, the conversion data stored in the ROM 11 are described by referring to FIG. 4 in which the grade of tone graduation is classified into 16 grades ranging from 0 to 15.

FIG. 4 is a graphical representation showing a curve L1 of a relationship between energy to be impressed on the thermal head and the tone graduation of image as well as a straight line L2 along the curve L1. In this case, it is to be noted that the straight line L2 does not correspond to the straight line being assumed in the range of $\Delta E$ in FIG. 1. Since the energy to be impressed plotted on the axis of abscissa can be converted to value of voltage based on value of the resistor heating element RT, the voltage values are put below the energy value.

For the sake of easy understanding of the undermentioned converting operation, explanation will be firstly made in respect of the case where the relationship between the tone graduation and the energy to be impressed to the thermal head is assumed to be represented by the straight line L2. As mentioned above, it is arranged in such a manner that voltage in accordance with tone graduation grade is subjected to A/D conversion and inputted to the ROM 11, whereby address designation is effected. If input voltage is 4 V, address "4" is designated so that the data stored in the address "4" are outputted. In this case, since the input voltage is 4 V, the grade of tone graduation is "4". Accordingly, value "8" should be stored at the address "4" of the ROM 11 since the energy to be impressed,is "8" corresponding to the tone graduation grade "4". (see A→B→C in FIG. 4) The energy "8" comes to 4 V, if it is converted to voltage basis. Namely, the energy "8" coincides with voltage 4 V inputted into the ROM 11. Thus, in such a case where said relationship is represented by the straight line L2, the ROM 11 merely performs equivalent conversion, which means data conversion is not necessary. In this particular case, the present invention become the same as the second case in the above-mentioned conventional techniques.

Next, the case where said relationship is represented by the curve L1 will be described hereunder.

If it is assumed that input voltage to the ROM 11 is 4 V same as in the case as mentioned above, this means that tone graduation grade "4" is designated. Therefore the value stored at address "4" of the ROM 11 should be about "10". (see A→b→ D→E in FIG. 4) When input voltage is 12 V, the energy about "13" necessary for attaining the grade "12" should be stored at address "12" of the ROM 11. (see F→G→H in FIG. 4) Similarly, conversion data in accordance with the curve L1 should be stored at addresses throughout the range from "0" to "15", which is shown in the following Table 1.

TABLE 1

| Address of ROM 11 (Input Voltage) | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Data in Address (Energy to be Impressed) | 4 | 8 | 9 | 10 | 10 | 11 | 11 | 12 | 12 | 12 | 13 | 13 | 13 | 14 | 15 | 19 |

The above relationship is changed in response to changes in the curve L1, or may be suitably changed at need. In FIG. 4, values of input voltage of the ROM 11 coincide with those of the tone graduation grade. However, they may not coincide with each other dependent upon equipments used. For example, there is such a case, wherein input voltage 4 V corresponds to the tone graduation grade "0.4". Even in this case, data conversion based on the curve L1 can be effected by suitably preparing Table 1 by means of a similar manner to that mentioned above.

The whole operation will now be described in respect of the above embodiment.

First of all, if a case where dots having the graduation grade "4" are recorded by means of the thermal head 14 is assumed, voltage 4 V is inputted to the terminal TA of the A/D converter 10. The voltage thus inputted is converted into digital signal by means of the A/D converter 10 on the basis of control pulse from the controller 15. Address of the ROM 11 is designated by means of the digital signal, and data "10" stored in address "4" of the ROM 11 are outputted at the timing of the control pulse from the controller 15. Output data "10" of the ROM 11 is held in the latch circuit 12L of the signal converter 12, which is converted into pulse having a suitable pulse width by means of the pulse width modulator 12M on the basis of the timing of the control pulse from the conroller 15, and the resulting pulse is further inputted to the base of a transistor TR of the driving circuit 13. The resistor heating element RT is energized by such application of pulse, wherby dots whose density is adjusted in accordance with the curve L1 represented in FIG. 4 are printed on a receiving paper (not shown).

In an embodiment of the thermal printer according to the present invention, a relationship between input voltage and the density of dots appeared actually on a receiving paper is represented by a straight line as in FIG. 5. As is apparent from FIG. 5, the thermal printer according to the present invention makes it possible to adjust the dot density with very excellent linearity. In this embodiment, 0.08 times of the each input voltage is preset so as to correspond to the graduation grade on the ordinate in FIG. 4. In this embodiment, a value of the resistor heating element RT is 300Ω, the bias voltage applied to the terminals TB to TD is 15.5 V, and a power consumption is 0.8 W.

FIG. 6 shows a relationship between input voltage and pulse width to be applied to a transistor in the driving circuit 13. In this case, as mentioned above, the power consumption of the resistor heating element RT is 0.8 W, and therefore 0.8 joule per second of energy is consumed. Accordingly, the product of the power consumption and pulse width is the whole energy consumed for printing the dots, and corresponds to the values on the abscissa in FIG. 4. Thus, FIG. 6 indicates characteristics corresponding to the curve L1 in the embodiment. Therefore, according to the present invention, the graduation grade can be adjusted with good linearity as shown in FIG. 5 even in the case where a curve represents non-linearity as illustrated in FIG. 6.

Although it is arranged in the above described embodiment in such a way that pulse width to be applied to the driving circuit 13 is changed to vary the graduation grade of image, other methods, for instance, a method in which pulse width is kept constant, whilst voltage applied to the terminals TB to TD, i.e., a value of current flowing through the resistor heating element RT is changed may also be adopted. Moreover, a thermal printer to which the present invention is applied is not limited to that of the type, as in the above embodiment, but, for example, the thermal printer may also be of a type in which ink which melts with heat is employed to effect the halftone image reproduction. More specifically, in the case where the relationship between the impressed energy to the ink and melting characteristics of the ink is non-linear as in the curve L1 of FIG. 4, whose linearity can be insured by determining conversion data in a manner similar to those as described above in accordance with the present invention.

Although a preferred embodiment of the invention has been illustrated and described, various modifications and changes may be made without departing from the spirit of the invention or the scope of the appended claims, and each of such modifications and changes is contemplated.

What is claimed is:

1. A thermal printer capable of reproducing halftone images, comprising:
a heater element for outputting heat onto a receiving paper, the quantity of said heat corresponding to the energy of an electric signal to be impressed thereto;
address signal forming means for forming an address signal corresponding to the content of tone gradation data;
memory means, having prestored therein at associated memory address locations a set of values of electric energy respectively required for reproducing image tone gradations corresponding to certain values of tone gradation data, for outputting the value of electric energy stored at the memory address location specified by said corresponding address signal;
signal generating means for generating said electric signal having energy corresponding to the value of electric energy outputted from said memory means; and
driving means for driving said heater element based on said electric signal.

2. A thermal printer described in claim 1 wherein said heater element is a thermal head, and said receiving paper is heat-sensitive paper.

3. A thermal printer described in claim 2 wherein said address signal forming means includes an A/D converter.

4. A thermal printer described in claim 2 wherein said signal generating means includes control pulse generating means for generating control pulse which controls timing at which image reproduction is made onto said receiving paper; and a signal converter for converting said control pulse into an electric signal having energy corresponding to the value of the electric energy outputted from said memory means.

5. A thermal printer described in claim 4 wherein said signal converter includes a latch circuit for latching the value of the electric energy outputted from said memory means; and a pulse width modulator for modulating the pulse width of said control pulse on the basis of the latched contents, and said driving means drives said heater element during the period of time corresponding to the pulse width of the modulated pulse signal.

6. A thermal printer described in claim 4 wherein said signal converter includes a latch circuit for latching the value of the electric energy outputted from said memory means; and a pulse level modulator for modulating the pulse level of said control pulse on the basis of the latched content, and said driving means drives said heater element by the level of the modulated pulse signal.

* * * * *